US008353025B2

(12) United States Patent
Mohanty et al.

(10) Patent No.: US 8,353,025 B2
(45) Date of Patent: *Jan. 8, 2013

(54) METHOD AND SYSTEM FOR DYNAMICALLY ESTABLISHING A VIRTUAL PRIVATE NETWORK (VPN) SESSION

(75) Inventors: Surendranath Mohanty, Karnataka (IN); Gautham Chambrakana Ananda, Karnataka (IN); Girish Ks, Karnataka (IN); Vishnu Govind Attur, Karnataka (IN)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,131

(22) Filed: May 27, 2011

(65) Prior Publication Data

US 2011/0231910 A1  Sep. 22, 2011

Related U.S. Application Data

(63) Continuation of application No. 12/016,375, filed on Jan. 18, 2008, now Pat. No. 7,954,145.

(30) Foreign Application Priority Data

Sep. 27, 2007 (IN) .......................... 2040/DEL/2007

(51) Int. Cl.
*G06F 9/00* (2006.01)
*G06F 15/16* (2006.01)
*G06F 17/00* (2006.01)
*G06F 7/04* (2006.01)
*G06F 17/30* (2006.01)
*G06F 15/173* (2006.01)
*H04L 29/06* (2006.01)

(52) U.S. Cl. .............. 726/15; 726/4; 709/225; 709/228; 709/229

(58) Field of Classification Search .................... 726/15
See application file for complete search history.

(56) References Cited

U.S. PATENT DOCUMENTS

| 6,182,226 | B1 | 1/2001 | Reid et al. |
| 6,304,973 | B1 | 10/2001 | Williams |
| 6,317,838 | B1 | 11/2001 | Baize |
| 6,539,483 | B1 | 3/2003 | Harrison et al. |
| 6,678,835 | B1 | 1/2004 | Shah et al. |

(Continued)

FOREIGN PATENT DOCUMENTS

WO  WO-2007091002 A1  8/2007

OTHER PUBLICATIONS

"Thin-Client SSL VPN (WebVPN) IOS Configuration Example with SDM", http://www.cisco.com/en/US/products/ps6496/products_configuration_example09186a008072aa61.shtml, Document ID: 70664, (2006).

*Primary Examiner* — Carolyn B Kosowski
(74) *Attorney, Agent, or Firm* — Osha Liang LLP (57) ABSTRACT

Techniques for virtual private network (VPN) access are provided. A dynamic determination, in response to privileges, is made as to whether a principal and a device of a principal are to receive a thin client virtual private network (VPN) installation for a thin client VPN session between the principal and a remote site or whether a clientless VPN session is appropriate. Dynamic switching between the clientless VPN session and thin client VPN session is permissible when the principal supplies the appropriate credentials for such a switch.

16 Claims, 4 Drawing Sheets

U.S. PATENT DOCUMENTS

| | | |
|---|---|---|
| 6,701,358 B1 | 3/2004 | Poisson et al. |
| 7,000,014 B2 | 2/2006 | Poisson et al. |
| 7,107,614 B1 | 9/2006 | Boden et al. |
| 7,117,526 B1 | 10/2006 | Short |
| 7,120,692 B2 | 10/2006 | Hesselink et al. |
| 7,424,543 B2 | 9/2008 | Rice, III |
| 7,444,508 B2 | 10/2008 | Karjala et al. |
| 7,447,751 B2 | 11/2008 | Wing et al. |
| 7,584,299 B2 | 9/2009 | Maxwell et al. |
| 7,624,438 B2 | 11/2009 | White et al. |
| 7,734,497 B2 | 6/2010 | Kelley et al. |
| 7,757,074 B2 | 7/2010 | Sundarrajan et al. |
| 7,844,718 B2 | 11/2010 | Polcha et al. |
| 7,860,953 B2 | 12/2010 | Bellinger et al. |
| 7,882,557 B2 | 2/2011 | Coskun et al. |
| 7,954,145 B2 | 5/2011 | Mohanty et al. |
| 2002/0019860 A1 | 2/2002 | Lee et al. |
| 2002/0065879 A1 | 5/2002 | Ambrose et al. |
| 2002/0116355 A1 | 8/2002 | Roschelle et al. |
| 2002/0124090 A1 | 9/2002 | Poier et al. |
| 2002/0169967 A1 | 11/2002 | Varma et al. |
| 2003/0167315 A1 | 9/2003 | Chowdhry et al. |
| 2005/0193103 A1 | 9/2005 | Drabik |
| 2005/0198532 A1 | 9/2005 | Comlekoglu et al. |
| 2006/0005008 A1 | 1/2006 | Kao |
| 2006/0037071 A1 | 2/2006 | Rao et al. |
| 2006/0074837 A1 | 4/2006 | Braddy et al. |
| 2006/0271500 A1 | 11/2006 | Obrea et al. |
| 2007/0150946 A1 | 6/2007 | Hanberger et al. |
| 2007/0157303 A1 | 7/2007 | Pankratov |
| 2007/0245409 A1 | 10/2007 | Harris et al. |
| 2008/0046993 A1 | 2/2008 | Mullick et al. |
| 2009/0037763 A1 | 2/2009 | Adhya et al. |
| 2009/0089874 A1 | 4/2009 | Mohanty et al. |
| 2009/0193126 A1 | 7/2009 | Agarwal et al. |
| 2010/0241846 A1 | 9/2010 | Sundarrajan et al. |

METHOD AND SYSTEM FOR DYNAMICALLY ESTABLISHING A VIRTUAL PRIVATE NETWORK (VPN) SESSION

RELATED APPLICATIONS

This application is a continuation of U.S. patent application Ser. No. 12/016,375, filed on Jan. 18, 2008 now U.S. Pat. No. 7,954,145, which claims the benefit of priority to India Patent Application No. 2040/DEL/2007 filed in the India Patent Office on Sep. 27, 2007 and entitled "TECHNIQUES FOR VIRTUAL PRIVATE NETWORK (VPN) ACCESS;" all of which are incorporated herein by reference in their entireties.

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

One ever present and daunting issue with this activity is Internet security. Some transactions may be innocuous and may not require any substantial security. However, a growing number of transactions do involve sensitive material associated with enterprises and individuals, such as corporate secrets, personal data, etc. A variety of security mechanisms exist to address this issue.

For example, some enterprises may install dedicated connections for secure communications between parties. Yet, this approach is less pervasive with the advent of Virtual Private Network (VPN) techniques. A VPN permits an insecure connection to be used to achieve secure communications between parties engaged in a transaction.

VPN transactions use authentication and encryption techniques for purposes of ensuring that communications are secure. Essentially, a VPN permits insecure communications lines to be used in a secure manner.

Yet, installation of VPN services on devices of a network is generally not a straightforward and easy procedure for network administrators. Each device must be visited and manually attended to for purposes of installing and configuring VPN capabilities. An enterprise with thousands of employees and devices will generally require that a network administrator or that a team of administrators manually visit or remotely attend to each device of the enterprise for purposes of properly installing and configuring software that supports a desired VPN solution. This is obviously time consuming and a substantial deployment issue for the enterprise to consider before embarking on an enterprise-wide VPN-based solution.

In some cases, the enterprise may only want a limited VPN solution with limited VPN capabilities, such that the VPN services can be provided in pre-delivered and pre-configured services that exist on the devices. However, to know in advance when limited VPN services is going to be appropriate and when full VPN services are needed is almost impossible to foresee and will almost certainly change for each user of the network at some point in time.

Consequently, there is a need for improved techniques for delivering and configuring VPN access.

SUMMARY

In various embodiments, techniques for virtual private network (VPN) access are provided. In an embodiment, a method for dynamically determining a type of VPN access for a principal is provided. More specifically, a principal is authenticated for access to a remote site, and a control module is dynamically downloaded from the remote site to process within a device associated with the principal. The control module is for facilitating establishment of a VPN session between the principal and resources of the remote site. Next, an indication is dynamically and in real-time received from the control module as to whether the principal is to be associated with a thin client installation for the VPN session or whether the principal is to be associated with a clientless access for the VPN session.

DETAILED DESCRIPTION

A "resource" includes a user, content, a processing device, a node, a service, an application, a system, a directory, a data store, a World-Wide Web (WWW) site, an end-user, groups of users, combinations of these things, etc. The terms "service," "module," and "application" may be used interchangeably herein and refer to a type of software resource that includes instructions, which when executed by a machine performs operations that change the state of the machine and that may produce output. Additionally, a "principal" is a type of resource that actively interacts with other resources. So, a principal may be a user or an automated service.

A "client" is an environment having one or more machines (processing devices, such as but not limited to a computer) that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) and insecure public communications network such as the Internet. Both a client and a server may be viewed as types of resources similar to what was described above with reference to the principal.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc.

A "virtual private network (VPN)" is a special type of network that is carved out of or tunneled through another network, such as an insecure network like the Internet. Technically, a VPN does not have to have security features it can be any sub network that tunnels out specific traffic. However, as used herein the VPN uses security features, such as authentication so that secure communications occur via the VPN.

A "thin client VPN" refers to enhanced features available from an enterprise to support a variety of network communications and protocols over a VPN. The modules that support the enhanced VPN are partially available on a remote site via a server and partially provided to a client device. The client modules acts as a proxy for the client when communicating with the server and the proxy permits seamless VPN access to a full panoply of enterprise resources (including legacy modules).

A "clientless VPN" refers to reduced features of network communications and protocols, such as just Hypertext Transfer Protocol (HTTP) over a Secure Sockets Layer (SSL—and collectively (HTTP+SSL) referred to as "HTTPS"). In a clientless VPN a device comes with a WWW browser that has SSL or HTTPS capabilities pre-installed and configured within it, the VPN capabilities are limited to this SSL or HTTPS that came pre-packaged with the browser. The benefit of this is that administration is relatively easy; the drawback is that some enterprise modules may not be accessible via a clientless VPN unless more advanced protocol communication is available. So, only limited access is available to a user interacting with an enterprise via a clientless VPN.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
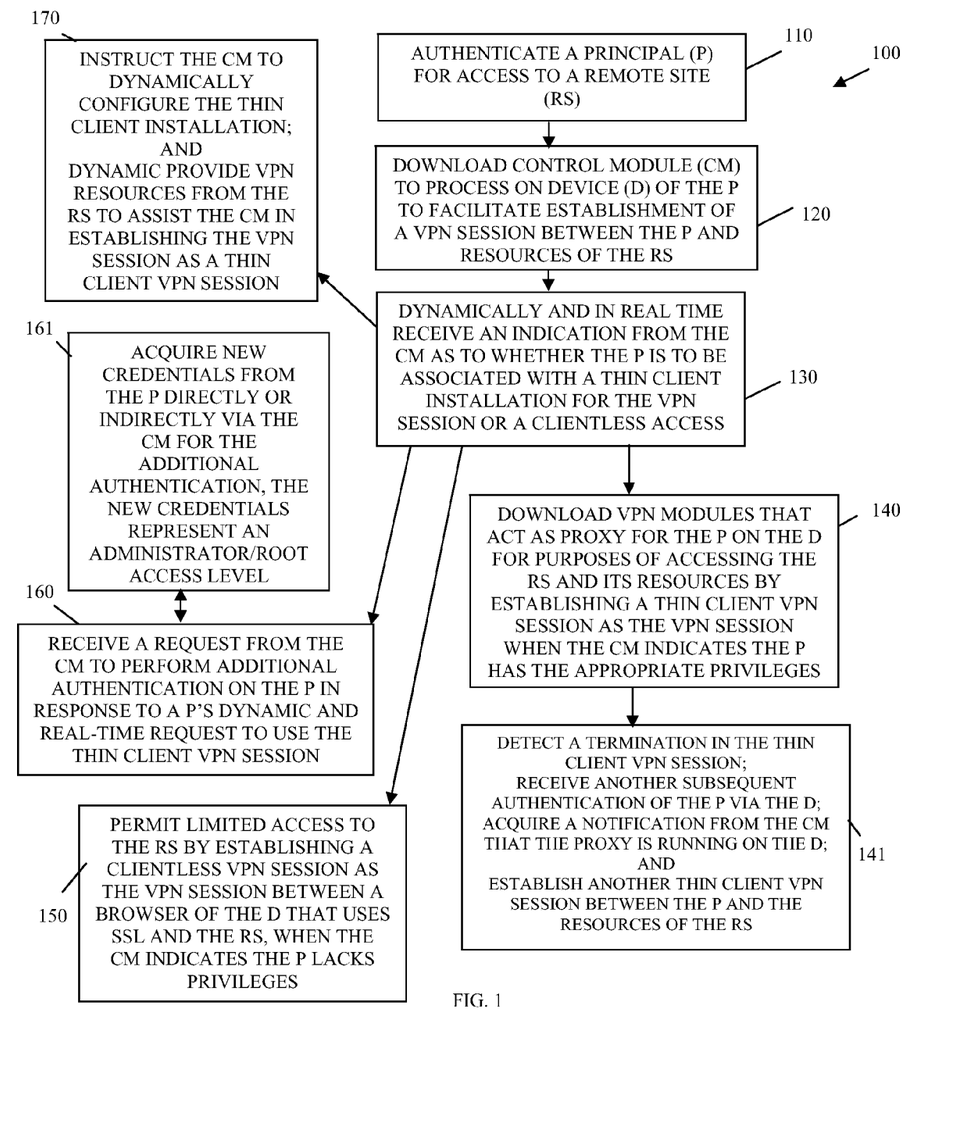
FIG. 1 is a diagram of a method for dynamically determining a type of virtual private network (VPN) access for a principal, according to an example embodiment.

FIG. 1 is a diagram of a method 100 for dynamically determining a type of virtual private network (VPN) access for a principal. The method 100 (hereinafter "remote VPN configuration service") is implemented as instructions in a machine-accessible and readable medium. The instructions when executed by a machine (computer or processing device) perform the processing depicted in FIG. 1. The remote VPN configuration service is also operational over and processes within a network. The network may be wired, wireless, or a combination of wired and wireless.

At 110, the remote VPN configuration service authenticates a principal for access to a remote site or resources associated with the remote site. In an embodiment, this occurs via a World-Wide Web (WWW) browser of a device (client computer) associated with the principal. That is, the principal access a website that identifies the remote site and logs into the remote site from the device of the principal. In another embodiment, the device's network connection may be dependent upon the principal successfully authenticating to the remote site, such that should that fail the network connection is shut down and the principal is unable to access the network. Authentication can be achieved in any of a variety of manners, such as but not limited to, biometrics, passwords, certificates, challenge response, etc.

Assuming the principal successfully authenticates to the remote site, at 120, the remote VPN configuration service dynamically downloads a control module to the device of the principal. In some cases, this may be an ActiveX or Applet module that downloads and executes with the browser of the principal automatically.

The control module is dynamically executed on the device and interacts with the remote VPN configuration service once it self-installs and self-executes on the device of the principal. This interaction occurs over the WAN, such as the Internet. The interactions facilitate the establishment of a VPN session between the principal and resources of the remote site over the WAN.

At 130, the remote VPN configuration service dynamically and in real-time receives an indication from the control module as to whether the principal is to be associated with a thin client installation for the VPN session with the remote site or whether the principal is to be associated with clientless access for the VPN session.

Again, a thin client VPN session permits a full range of services and resources to be accessed and processed by the principal utilizing the device during the VPN session. Such a situation necessitates additional security mechanisms or privileges of the principal be established. This is done in a dynamic and flexible manner herein and below. Conversely, the clientless VPN session has limited VPN services and permits limited and restrained access to selective resources of the remote site. The ability to communicate with the remote site via a clientless VPN session may occur using the SSL or HTTPS capabilities of the principal's pre-installed WWW browser; however, such an arrangement may not permit other types of protocol communications that may be needed to access certain resources or services of the remote site.

In an embodiment, at 140, the remote VPN configuration service dynamically downloads one or more VPN modules to the device of the principal, which act as a proxy for the principal on the device for purposes of accessing the remote site and its resources. This is done for purposes of dynamically establishing a thin client VPN session on the device of the principal when the control module indicates that the principal has acceptable privileges for the thin client installation.

According to another situation, at 141, the remote VPN configuration service may subsequently detect (after the establishment of the thin client VPN session) that the session between the principal and the remote site is terminated (either normally or abnormally). Subsequent to that situation, the remote VPN configuration service receives another and subsequent authentication of the principal coming from the device. The remote VPN configuration service then acquires a notification from the control module of the principal's device that the proxy is already running on the device. In response to this, the remote VPN configuration service establishes another thin client VPN session between the principal and the resources of the remote site or the remote site as a whole.

In some circumstances, at 150, the remote VPN configuration service permits limited and restrained access to the remote site and its resources by establishing a clientless VPN session as the VPN session between the browser of the principal and the remote site. The browser uses SSL or HTTPS. This situation occurs when the control module indicates to the remote VPN configuration service that the principal lacks privileges for a thin client VPN session or when the configuration service indicates that the principal specifically desires a clientless VPN session.

It is noted that the principal may properly be engaged in a thin client VPN session with the remote site and dynamically request that the session be terminated and transformed into a clientless VPN session or vice-versa. However, any change that raises the access level, such as switching from clientless to thin client VPN sessions, necessitates that proper privileges and principal credentials are satisfied according to policy before the remote VPN configuration service entertains and processes such a VPN session change.

In an embodiment, at 160, the remote VPN configuration service receives a request from the control module to perform additional authentication on the principal in response to a principal's dynamic and real-time request to use the thin-client session. This illustrates the point made above with the discussion of the processing at 150; namely, a principal may dynamically request that a clientless VPN session be converted to a thin client VPN session. The control module may self-authenticate the credentials, may enlist a trusted third-party service to authenticate the principal and the credentials, or (as is the case here) the control module can use the remote VPN configuration service to perform the additional authentication.

At 161, the remote VPN configuration service may acquire new credentials in response to a request made at 160. The credentials may be acquired directly or indirectly from the principal. For example, the control module may indirectly acquire the credentials via a predefined location within the device, via an external trusted third-party service, via a hardware key on the device, etc. The control module may also directly acquire the credentials from the principal by providing a dialogue box for the principal to indicate the credentials or to indicate where and/or how the control module can obtain the credentials.

In some cases, at 170, the thin client installation may be pre-packaged and be present on the device of the principal but may not be running or configured to run for the principal. In such a case, the remote VPN configuration service can instruct the control module to configure the thin client installation for use on the device by the principal and dynamically and in real time provide the necessary additional VPN resources from the remote site to the device for purposes of assisting the control module in establishing the VPN session as a thin client VPN session. Again, this scenario occurs when the proper privileges for the principal are dynamically resolved to the satisfaction of the control module and/or the remote VPN configuration service. So, in some cases, the remote VPN configuration service may trust the control module to independent make a determination as to whether the privileges are appropriate while in other situations the remote VPN configuration service may independently determine that the privileges are satisfied.

The processing discussed for the remote VPN configuration service reflects a server machine side of the communications. The processing of the control module that occurs within the client (principal device) side of the communications is now described with reference to the method 200 of the FIG. 2.

Figure 2:
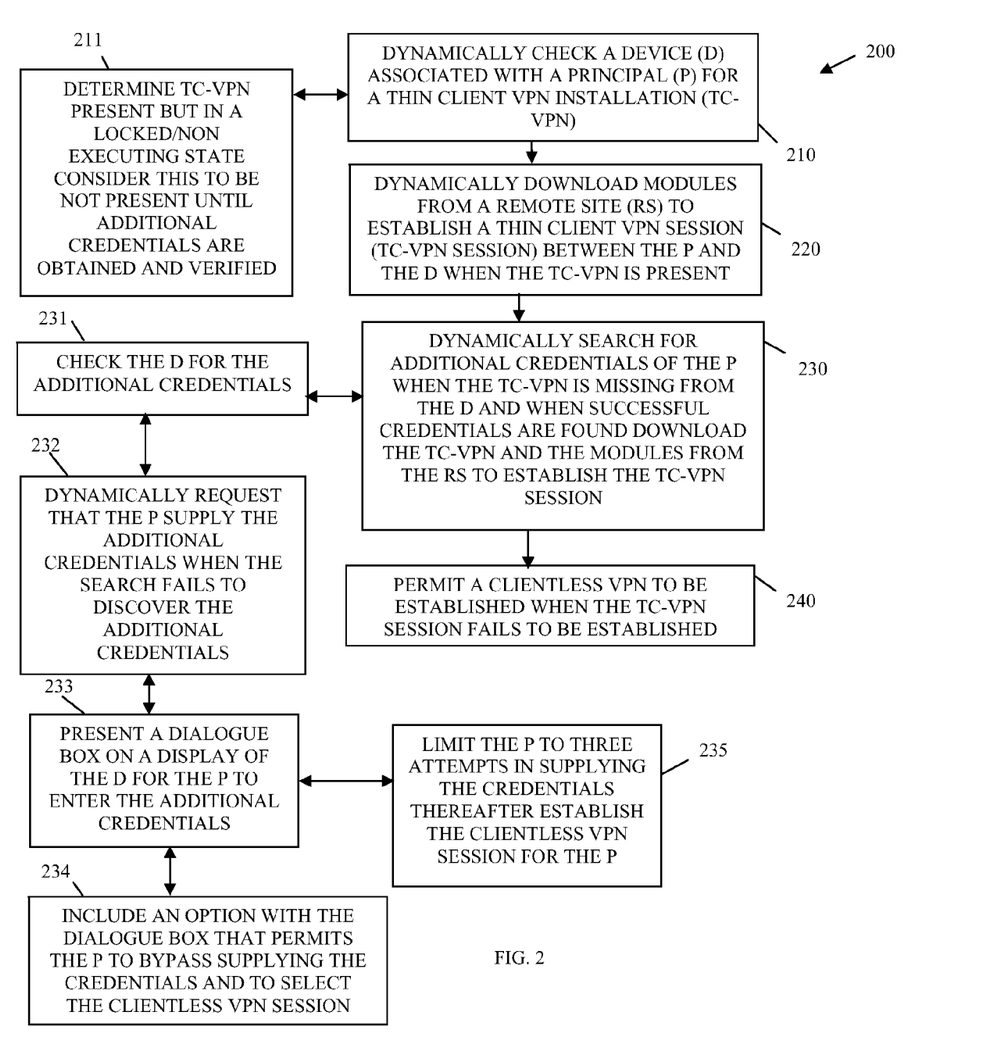
FIG. 2 is a diagram of another method for dynamically determining a type of VPN access for a principal, according to an example embodiment.

FIG. 2 is a diagram of another method 200 for dynamically determining a type of VPN access for a principal, according to an example embodiment. The method 200 (hereinafter "local VPN configuration service") is implemented in a machine-accessible and readable medium as instructions. The instructions when executed by a machine perform the processing depicted in the FIG. 2. Moreover, the local VPN configuration service is operational over a network, and the network may be wired, wireless, or a combination of wired and wireless.

In an embodiment, the local VPN configuration service is the control module discussed in detail above with reference to the method 100 of the FIG. 1. Thus, it is noted that the local VPN configuration service may itself me dynamically downloaded, self-installed, and self-executed in a device (client) associated with a principal.

Furthermore, the local VPN configuration service presents a perspective of the client-based processing that occurs via interactions with server-based processing to configure a client device of a principal for the appropriate VPN access service to an enterprise's remote site and its resources. The server-based processing was presented above with the remote VPN configuration service represented by the method 100 of the FIG. 1.

At 210, the local VPN configuration service dynamically checks a device associated with a principal for a thin client VPN installation. In some cases, at 211, the local VPN configuration service determines that the thin client VPN installation is in fact present on the device of the principal but in a locked, compressed, encrypted, and/or non executing state. This indicates that although the principal's device possesses the thin client VPN installation it is not in a condition for use and is not configured. Thus, the local VPN configuration service considers such a presence to be as if the thin client VPN installation was not present on the device for purposes of the remaining process discussed herein and below. Such pre-packaging may eliminate the need to subsequently download some control data and resources when and if the principal is allowed to run a thin client VPN session with the remote site and its resources, since the control data and resource can be decompressed or decrypted from the device when needed.

At 220, the local VPN configuration service dynamically downloads modules from the remote site to establish a thin client VPN session between the principal and the device when the thin client VPN installation is present and properly configured on the device. This may include support for particular protocols within the thin client VPN session, and the like. Additionally, this may include proxy modules that permit certain protocols and services to be realized via the server or remote site.

At 230, the local VPN configuration service dynamically searches for additional credentials of the principal when the thin client installation is missing from the device. When successful and authenticated credentials are found, the local VPN configuration service proceeds to download the thin client installation and the modules from the remote site to dynamically establish and configure the thin client VPN session between the principal and the remote site. The processing at 230 occurs when the VPN installation is not present and when the principal wants to establish a thin client VPN session with the remote site.

According to an embodiment, at 231, the local VPN configuration service checks the device for additional credentials to determine the privileges of the principal when a request is made for the thin client VPN session. This may entail searching or querying a trusted third-party service for the credentials or searching secure directories, hardware devices, hardware keys, etc. to obtain the credentials on behalf of the principal.

In a particular situation, at 232, the local VPN configuration service dynamically requests that the principal interactively supply the additional credentials when the search to locate them fails or when policy indicates that the principal is to be consulted for the additional credentials. At 233, this may be achieved by the local VPN configuration service presenting a dialogue box on a display of the device for purposes of having the principal enter the additional credentials. The principal may also enter instructions on where and/or how the local VPN configuration service can obtain the credentials.

In one case, at 234, the local VPN configuration service includes an option within the dialogue box that permits the principal to bypass supplying the credentials altogether and to specifically select a clientless VPN session for communicating with the remote site and its resources.

In an embodiment, at 235, the local VPN configuration service limits the principal to three attempts in providing authenticated credentials. If the principal fails after three attempts to supply valid credentials for a thin client VPN session to proceed, then the local VPN configuration service automatically establishes a clientless VPN session or denies all access entirely with the remote site and its resources.

According to an embodiment, at 240, the local VPN configuration service permits a clientless VPN session to be dynamically established when the thin client VPN session fails to be successfully established or when the principal specifically requests the clientless VPN session.

One now appreciates with the discussion of the method 100 and 200 of the FIGS. 1 and 2, respectively, how VPN access can be dynamically and in real-time resolved based on privileges of a user (type of principal) at run time. A more robust VPN session can be established when privileges permit via a thin client VPN installation and session; conversely a more limited VPN session is established when privileges are lacking or specific requests are made for a clientless VPN session. In this manner, a network administrator does not have to worry about visiting each machine of a network to install VPN capabilities and does not have to worry when it is appropriate for more robust and less robust VPN access. All of this is automatically and dynamically handled for an enterprise with the processing discussed herein (above and below).

Figure 3:
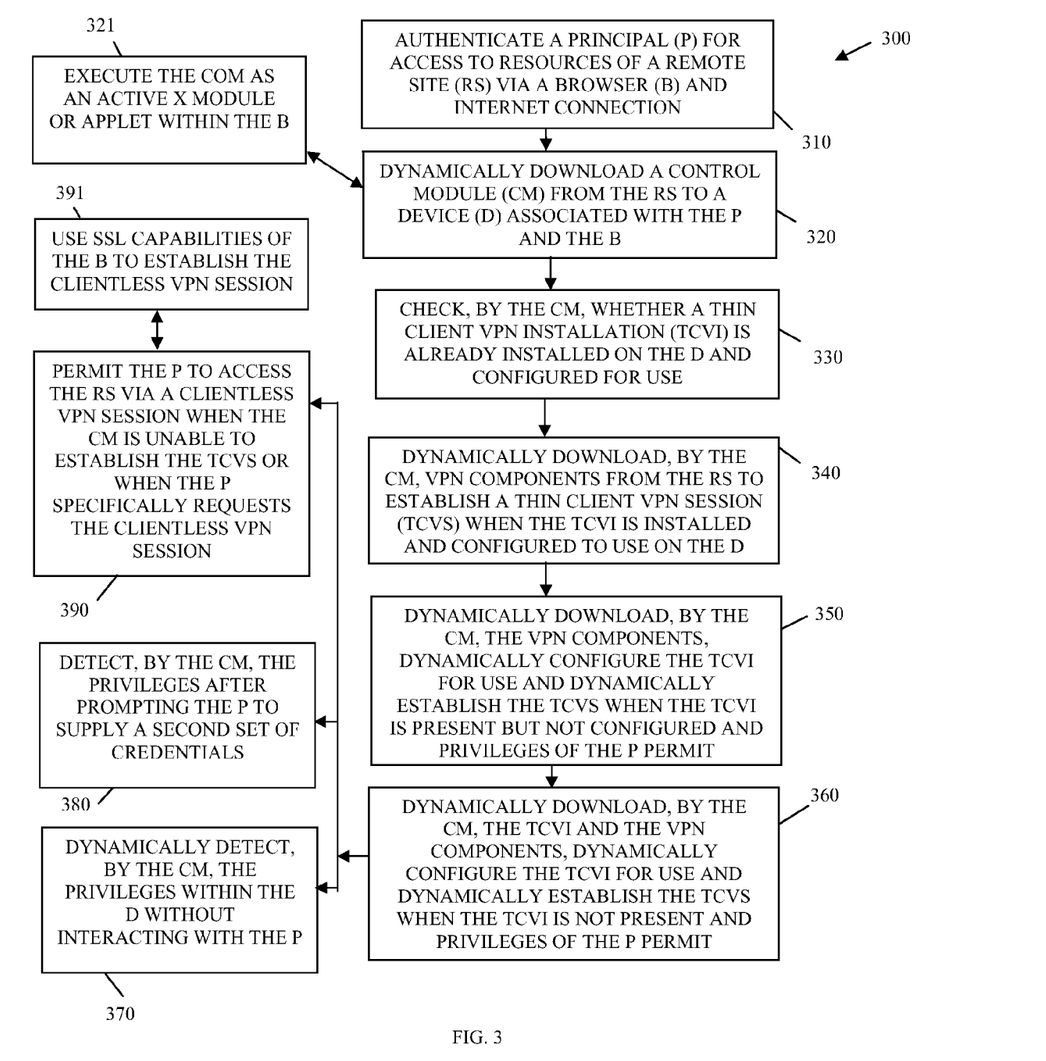
FIG. 3 is a diagram of yet another method for dynamically determining a type of VPN access for a principal, according to an example embodiment.

FIG. 3 is a diagram of yet another method 300 for dynamically determining a type of VPN access for a principal, according to an example embodiment. The method 300 (hereinafter "VPN configuration service") is implemented in a machine-accessible and readable medium as instructions. The instructions when executed by a machine perform the processing depicted in the FIG. 3. Moreover, the VPN configuration service is operational over a network, and the network may be wired, wireless, or a combination of wired and wireless.

The VPN configuration service represents processing associated with both remote and local VPN configuration for a client of a principal. Thus, the VPN configuration service may be viewed, among other things, as a combination of both methods 100 and 200 of the FIGS. 1 and 2, respectively.

At 310, the VPN configuration service authenticates a principal for access to resources or a remote site via a first set of credentials supplied by the principal via a WWW browser over an Internet connection between a device of the principal (client device) and a server device of the remote site. In an embodiment, the first set of credentials is supplied when the principal attempts to initially log into the network. In another case, the first set of credentials is supplied when the principal attempts to access the remote site as a whole or a selective resource of the remote site.

At 320, the VPN configuration service dynamically downloads over the Internet a control module. The control module is downloaded into the WWW browser from the remote site. The control module is automatically executed in the device within the processing environment of the browser.

In an embodiment, at 321, the control module is downloaded and executed within the browser as an ActiveX or Applet.

At 330, the VPN configuration service checks, via the control module, whether a thin client VPN installation is already installed on the device of the principal and configured for use on that device. In other words, one of the first actions of the control module is to check whether a valid thin client VPN installation is present and configured on the principal's device.

Next, at 340, the VPN configuration service, via the control module, dynamically downloads additional VPN components from the remote site to dynamically establish a thin client VPN session between the principal and the remote site. This processing takes place when the VPN configuration service determines that the thin client VPN installation is installed on the principal device and is configured for use on that device.

At 350, the VPN configuration service, via the control module, dynamically downloads the VPN components, dynamically configures the thin client VPN installation for use, and dynamically establishes the thin client VPN session. This processing takes place when the thin client VPN installation is present on the device but is not properly configured and when detected or resolved privileges of the principal indicate that the thin client VPN session is permissible.

At 360, the VPN configuration service, via the control module, dynamically downloads the thin client VPN installation and the VPN components, dynamically configures the thin client VPN installation for use, and then dynamically establishes the thin client VPN session. This processing occurs when the thin client VPN installation is not present on the device and when the detected or resolved privileges of the principal indicate that the thin client VPN session is permissible.

According to an embodiment, at 370, the VPN configuration service dynamically detects, via the control module, the privileges within the device or an environment of the device without directly interacting with the principal. This may occur when the privileges are embedded in keys held within the device or resources of the device that the control module can access on behalf of the principal to acquire credentials to verify the privileges.

In another case, at 380, the VPN configuration service detects, via the control module, the privileges after interactively and dynamically prompting the principal to supply a second set of credentials. Again, in some cases the principal may instruct the control module on where and/or how to obtain the second set of credentials, rather than supplying the actual second set of credentials directly to the control module.

In a particular situation, at 390, the VPN configuration service permits the principal to access the remote site via a clientless VPN session when the control module is unable to establish thin client VPN session. It may also be the case that the VPN configuration service processed with the clientless VPN session when the principal specifically requests the clientless VPN access.

In an embodiment, at 391, the VPN configuration service establishes the clientless VPN session using the SSL capabilities that are pre-packed and included within the capabilities of the WWW browser.

Figure 4:
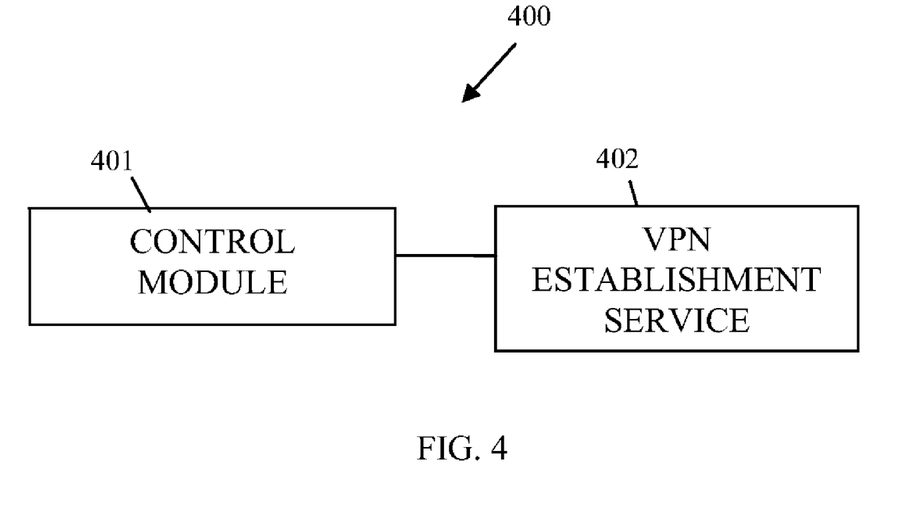
FIG. 4 is a diagram dynamic VPN access resolution system, according to an example embodiment.

FIG. 4 is a diagram dynamic VPN access resolution system 400, according to an example embodiment. The dynamic VPN access resolution system 400 is implemented as instructions on or within a machine-accessible and readable medium. The instructions when executed by one or more machines perform, among other things, processing depicted with respect to the methods 100, 200, and 300 of the FIGS. 1-3, respectively. The dynamic VPN access resolution system 400 is also operational over a network, and the network may be wired, wireless, or a combination of wired and wireless.

The dynamic VPN access resolution system 400 includes a control module 401 and a VPN establishment service 402. Each of these and their interactions with one another will now be discussed in turn.

The control module 401 is implemented in a machine-accessible and readable medium and is to process on a client machine of a principal. Some example processing associated with the control module 401 is presented above with reference to the methods 200 and 300 of the FIGS. 2 and 3, respectively.

The control module 401 is initially dynamically downloaded over a WAN connection from the server machine to the client machine. This occurs once the principal successfully authenticates for access to the server machine. Once on the client machine, the control module 401 self-loads and executes on the client machine.

During operation on the client machine, the control module 401 dynamically and in real time determines, in response to run-time resolved privileges associated with the principal, whether a thin client VPN installation on the client machine is to be used for the principal to communicate with the remote site over the WAN or whether a clientless VPN session is to be established and used.

In an embodiment, after a successful thin client installation occurs on the client machine for a first iteration or time, the control module 401 subsequently and thereafter re-establishes subsequent thin client VPN sessions for the principal when the principal returns and re-authenticates to the remote site.

According to an embodiment, the control module 401 dynamically prompts the principal for credentials that support the privileges before establishing the thin client VPN session. The credentials are successfully authenticated before the thin client VPN session is established.

In still another embodiment, the control module 401 dynamically switches from the clientless VPN session to the thin client VPN session in response to a dynamic request of the principal and in response to the principal supplying the privileges/credentials used for the thin client VPN session.

The VPN establishment service 402 is implemented in a machine-accessible and readable medium and is to process on a server machine. The client machine and the server machine are remote from one another over a wide-area network (WAN) connection, such as the Internet. Some example features associated with the VPN establishment service 402 may be found above with reference to the methods 100 and 300 of the FIGS. 1 and 3, respectively.

The VPN establishment service 402 operates on the server machine and interacts with the control module 401 by supplying the necessary thin client modules and VPN modules for establishing the thin client VPN session. In some cases, the VPN establishment service 402 may also supply authentication services and policy to the control module 401.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method residing in a non-transitory computer-readable medium for execution on a machine, comprising:

downloading a control module to process within a device associated with a principal for establishment of a virtual private network (VPN) session between the principal and resources of a remote site;

dynamically receiving an indication from the control module as to whether the principal is to be associated with a thin client installation for the VPN session or whether the principal is to be associated with a clientless access for the VPN session;

downloading VPN modules that act as a proxy for the principal on the device for purposes of accessing the remote site and the resources by establishing a thin client VPN session as the VPN session when the control module indicates the principal has privileges for the thin client installation;

detecting a termination in the thin client VPN session between the principal and the remote site;

receiving another subsequent authentication of the principal via the device;

acquiring a notification from the control module that the proxy is running on the device; and establishing another thin client VPN session between the principal and the resources.

2. The method of claim 1, wherein the downloading of the control module further includes authenticating the principal for access to the remote site.

3. The method of claim 1, further comprising; permitting limited access to the remote site by establishing a clientless VPN session as the VPN session between a browser, when the control module indicates the principal lacks privileges for the thin client installation and is to use the clientless VPN session.

4. The method of claim 1, further comprising: receiving a request from the control module to perform additional authentication on the principal.

5. The method of claim 4, wherein the receiving further includes acquiring new credentials from the principal directly or indirectly via the control module for the additional authentication.

6. The method of claim 1, further comprising:

instructing the control module to dynamically configure the thin client installation on the device of the principal; and dynamically providing VPN resources from the remote site to assist the control module in establishing the VPN session as the thin client VPN session with access to the resources of the remote site.

7. A machine-implemented method residing in a non-transitory computer-readable medium for execution on a machine, comprising:

dynamically downloading modules from a remote site to establish a thin client Virtual Private Network (VPN) session between a principal and a device when a thin client installation is present;

dynamically searching for credentials of the principal when the thin client installation is missing from the device and when successful downloading the thin client installation and the modules from the remote site to establish the thin client VPN session and checking the device for the credentials and dynamically requesting that the principal supply the credentials when the searching fails to discover the credentials, wherein dynamically searching further includes presenting a dialogue box on a display of the device for the principal to enter additional credentials, wherein presenting further includes including an option within the dialogue box that permits the principal to bypass supplying the additional credentials and select a clientless VPN session; and permitting the clientless VPN session to be established between the principal and the remote site when the thin client VPN session fails to be established.

8. The method of claim 7, wherein dynamically downloading further dynamically checking the device associated with the principal for the thin client VPN installation.

9. The method of claim 7, wherein the including the option further includes limiting a total number of attempts that the principal is permitted to make to enter the additional credentials to three attempts and when after three failed attempts determining that the clientless VPN session is to be established.

10. The method of claim 7, wherein the dynamically searching further includes determining the thin client installation is present but in a locked state on the device or a no executing state on the device and in treating this as a condition in which the thin client installation is not to be considered present on the device until the additional credentials are successfully obtained and verified.

11. A machine-implemented method residing in a non-transitory computer-readable medium for execution on a machine, comprising:

dynamically downloading modules from a remote site, via a control module, to establish a thin client VPN session between a principal and a device when a thin client installation is present;

dynamically searching for additional credentials of the principal when the thin client installation is missing from the device and when successful credentials are found then downloading the thin client installation and the modules from the remote site to establish the thin client VPN session and checking the device for the additional credentials and dynamically requesting that the principal supply the additional credentials when the searching fails to discover the additional credentials and presenting a dialogue box on a display of the device for the principal to enter the additional credentials limiting a total number of attempts that the principal is permitted to make to enter the additional credentials to three attempts and when after three failed attempts determining that a clientless VPN session is to be established; and permitting the clientless VPN session to be established between the principal and the remote site when the thin client VPN session fails to be established.

12. The method of claim 11, wherein the downloading of the thin client installation further includes dynamically checking the device associated with the principal for the thin client virtual private network (VPN) installation.

13. The method of claim 11, wherein the checking the device further includes determining the thin client installation is present but in a locked state on the device or a no executing state on the device and in treating this as a condition in which the thin client installation is not to be considered present on the device until the additional credentials are successfully obtained and verified.

14. The method of claim 11, further comprising: executing the control module as an ActiveX module or an Applet within a World-Wide Web(WWW) browser.

15. The method of claim 14, further comprising: using secure socket layer (SSL) communication capabilities of the WWW browser to establish the clientless VPN session.

16. The method of claim 11, further comprising: permitting the principal to access the remote site via the clientless VPN session when the control module is unable to establish the thin client VPN session or when the principal specifically requests the clientless VPN session.

* * * * *

UNITED STATES PATENT AND TRADEMARK OFFICE
CERTIFICATE OF CORRECTION

PATENT NO.         : 8,353,025 B2                                          Page 1 of 1
APPLICATION NO.    : 13/118131
DATED              : January 8, 2013
INVENTOR(S)        : Mohanty et al.

It is certified that error appears in the above-identified patent and that said Letters Patent is hereby corrected as shown below:

In column 12, line 32, in Claim 14, delete "Web(WWW)" and insert -- Web (WWW) --, therefor.

Signed and Sealed this
Ninth Day of April, 2013

Teresa Stanek Rea
*Acting Director of the United States Patent and Trademark Office*